March 8, 1938.   C. J. SCHUHMANN   2,110,684
SNAP LOCK BUCKLE
Filed Nov. 11, 1936

INVENTOR
Christian J. Schuhmann
BY
ATTORNEY

Patented Mar. 8, 1938

2,110,684

UNITED STATES PATENT OFFICE 2,110,684

SNAP LOCK BUCKLE

Christian J. Schuhmann, New York, N. Y.

Application November 11, 1936, Serial No. 110,246

3 Claims. (Cl. 24—75)

This invention relates to new and useful improvements in a snap lock buckle.

The invention has for an object the construction of a snap lock buckle which is characterized by the fact that it is constructed of a socket section and a stud section, arranged to engage each other when pressed together in end alignment with each other and to disengage each other when bent angularly.

More specifically, the invention contemplates constructing the socket section of a strip of metal with a portion thereof bent upon itself forming adjacent layers between which a lip portion from the stud section may engage.

The invention proposes constructing the stud section with the said lip portion formed with stamped out catch elements adapted to engage in cutout portions or stamped out portions in the inner layer of said socket section for holding the sections together.

Still further the invention proposes to provide each of the socket and stud sections with a clamp jaw arranged for holding a strip of cloth or elastic. The buckle is then particularly adapted for suspenders, shoulder straps and other similar articles.

Another one of the objects of this invention is to provide a bar extending transversely across the inner layer of said socket section for controlling the resiliency thereof and arranged adjustable and movable to various positions to permit the selection of a required or desired resiliency.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 3:
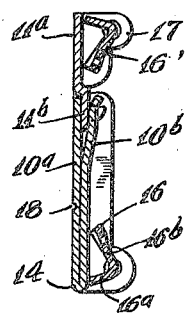
Fig. 3 is a transverse sectional view taken on the line 3—3 of Fig. 2.

The snap lock buckle comprises essentially a socket section 10 and a stud section 11. Each of these sections are adapted to be clamped upon strap elements such as indicated by reference numerals 12 and 13. The socket section 10 comprises essentially a strip of material 10$^a$ with a portion 10$^b$ bent upon itself forming adjacent layers. The bend is indicated by reference numeral 14. Lug portions 15 are bent from the edges of the outer layer 10$^a$. A clamp jaw 16 is mounted upon these lug portions and cooperates with the inner layer 10$^b$ for holding the strip of cloth or elastic 13 when desired. The clamp jaw 16 comprises essentially a serrated front gripping portion 16$^a$ and a rear handle portion 16$^b$ at the junction of which there is a trunnion 16$^d$, the elements of which pivotally engage upon the lug portions 15. As illustrated in Fig. 3 the clamp jaw 16 is past its dead center turning clockwise, and is thus in a locked position as when a strip of material is clamped thereby. To open the clamp jaw it must be pivoted clockwise which is possible by engaging one's finger nail beneath a bent out portion 16$^c$ formed on the handle end 16$^b$.

Figure 1:
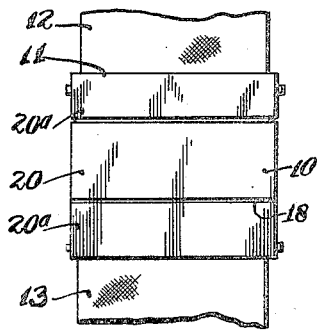
Fig. 1 is a front elevational view of a snap lock buckle constructed according to this invention and shown attached to the ends of strap elements.
Figure 2:
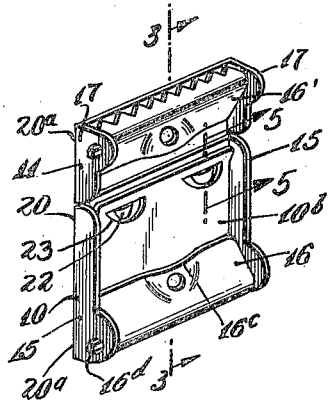
Fig. 2 is a perspective view of a snap lock buckle, illustrated per se and viewed partially from the back and one edge.

The stud section 11 comprises a member 11$^a$ with a lip portion 11$^b$ adapted to engage in between the edges of said layers 10$^a$ and 10$^b$. Lug members 17 are bent from the sides of the member 11$^a$. A clamp jaw 16' is mounted between said lug members 17 and cooperates with the member 11$^a$ for holding the strip of cloth or elastic 12 clamped in position when desired. The lip portion 11$^b$ is slightly offset relative to the member portion 11$^a$, a distance equal to the thickness of the metal 10$^a$ so that the outer faces of the member 11$^a$ and the layer 10$^a$ are flush. A transverse line 18 is embossed into the layer 10$^a$ to balance the design of the snap lock buckle, that is, to form a central panel 20 and end panels 20$^a$ as clearly shown in Fig. 1.

Several fastening elements 22 are formed upon the lip portion 11$^b$ and are adapted to coact with complementary fastening elements 23 on the inner layer 10$^b$ for resiliently and releasably holding the socket and stud sections together. The fastening elements 22 comprise small portions stamped from the material of the lip portion 11$^b$. The fastening elements 23 comprise openings stamped in the layer 10$^b$ and adapted to receive the projecting portions 22 in such a manner that the top edges of the projecting portions 22 engage the top edge of the openings 23. When the stud section is engaged into the socket section the stamped out portions 22 act as cams for momentarily spreading apart the layers 10ᵃ and 10ᵇ until the sections 22 reach a position in the openings 23. Then the upper portion of the layer 10ᵇ snaps back to its original position and so the parts are locked.

Figure 4:
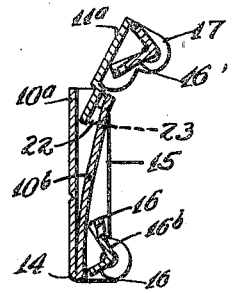
Fig. 4 is a view similar to Fig. 3 but illustrating the stud section bent relative to the socket section as is necessary to disconnect these sections.

In order to separate the socket section from the stud section it is necessary that the stud section be bent relative to the socket section and towards the layer 10ᵇ as shown in Fig. 4. When thus bent the projections 22 will be drawn out from the openings 23 and thus the socket and the stud sections may be separated.

Figure 6:
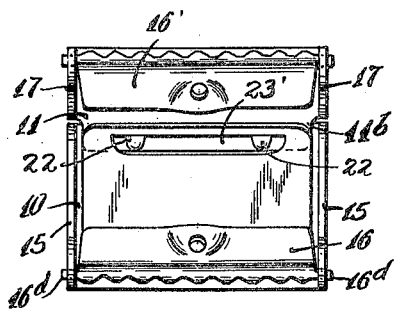
Fig. 6 is a rear elevational view of a snap lock buckle constructed according to a modification of the invention.
Figure 5:
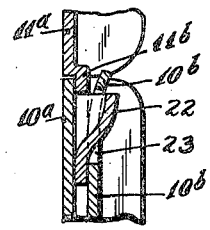
Fig. 5 is a fragmentary enlarged sectional view taken on the line 5—5 of Fig. 2.

In Fig. 6 a modified form of the invention has been disclosed which is very similar to the previous form, distinguishing only in the construction of the fastening element 23'. This fastening element comprises a longitudinal opening formed in the layer 10ᵇ and taking the place of the several openings 23. This longitudinal opening 23' permits the projections 22 to engage therein and against the top edge thereof. In other respects this form of the invention is identical to the previous form and similar parts may be identified by the same reference numerals.

Figure 7:
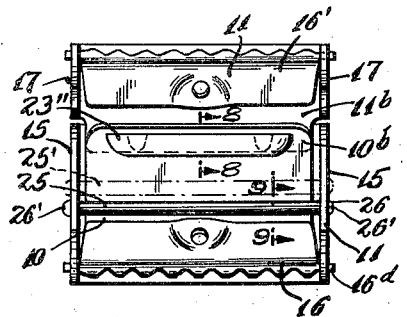
Fig. 7 is another rear elevational view of another snap lock buckle constructed according to a further modified form.
Figure 8:
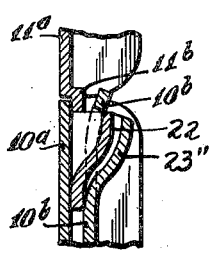
Fig. 8 is a sectional view taken on the line 8—8 of Fig. 7.
Figure 9:
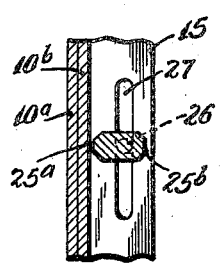
Fig. 9 is a sectional view taken on the line 9—9 of Fig. 7.

In Figs. 7-9 inclusive another modified form of the invention has been disclosed which distinguishes in several respects from the prior forms. In the first place there is a fastening element 23'' formed upon the layer 10ᵇ and comprising a longitudinal stamped out portion from this layer arranged so as to have a top edge. This stamped out portion 23'' forms a socket into which the projections 22 may engage and against the top side of the opening produced by the stamped out portion 23''.

There is also a bar 25 extending transversely across the inner layer 10ᵇ for controlling the resiliency of this layer. This bar has eccentric headed ends 26 slidably engaging through slots 27 formed in the lug portions 15 by which the bar may be moved to an inoperative position and also to various locations along the inner layer 10ᵇ. More specifically, the bar 25 has a flat side 25ᵃ which is adapted to normally engage against the outer face of the layer 10ᵇ and form an abutment to limit the flexing of the layer. That portion of the layer 10ᵇ above the bar 25 may flex outwards, but that portion below is rigidly held. When the bar 25 is shifted upwards to different positions, as for example that indicated by the dot and dash lines 25' in Fig. 7, the free portion is reduced in width and consequently it becomes stiffer and so its resiliency is relatively changed.

In order to shift the bar 25 it is necessary that the bar first be rotated so that the side 25ᵃ is moved out of contact from the face of the layer 10ᵇ. Preferably, the bar should be rotated through 180° so that the side 25ᵇ is towards the layer 10ᵇ. This side is closer to the heads 26 and consequently offers no resistance against the sliding of the bar. The bar may then be moved to a new position. Preferably, the heads 26 are formed with slots 26' for receiving a screw driver or other turning tool by which the bar 25 may be turned into operative or inoperative position as desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A snap lock buckle comprising a socket section and a stud section, said socket section comprising a strip of metal with a portion thereof bent upon itself forming adjacent layers, lug portions bent from the outer layer, a clamp jaw mounted on said lug portions and cooperating with said inner layer for holding a strip of cloth or elastic, said stud section comprising a member with a lip portion adapted to engage inbetween the edges of said layers, lug members bent from said member, a clamp jaw mounted on said lug members and cooperating with said member for holding a strip of cloth or elastic, fastening elements on said lip portion coacting with fastening elements on said inner layer for resiliently releasably holding said socket and stud sections together, a bar extending transversely across said inner layer for controlling the resiliency thereof and having eccentric headed ends slidably engaging in slots in said lug portions by which the said bar may be moved to an inoperative position and to various locations upon said inner layer.

2. A snap lock buckle comprising a socket section and a stud section, said socket section comprising a strip of metal with a portion thereof bent upon itself forming adjacent layers, lug portions bent from the outer layer, a clamp jaw mounted on said lug portions and cooperating with said inner layer for holding a strip of cloth or elastic, said stud section comprising a member with a lip portion adapted to engage inbetween the edges of said layers, lug members bent from said member, a clamp jaw mounted on said lug members and cooperating with said member for holding a strip of cloth or elastic, fastening elements on said lip portion coacting with fastening elements on said inner layer for resiliently releasably holding said socket and stud sections together, a bar extending transversely across said inner layer for controlling the resiliency thereof and having eccentric headed ends slidably engaging in slots in said lug portions by which the said bar may be moved to an inoperative position and to various locations upon said inner layer, said headed ends being formed with slots.

3. In a snap lock buckle, a socket section comprising a strip of metal with a portion thereof bent upon itself forming adjacent inner and outer layers with free end portions, a stud section comprising a member with a lip portion adapted to be engaged between the adjacent layers of said socket section, fastening elements on said lip portion engageable with complementary fastening elements on the inner layer of said socket section for resiliently releasably holding said socket and stud sections together, lug portions formed on the edges of the outer layer of said socket section and being bent at right angles to said outer layer and across a portion of the edge of the inner layer of said socket section, and a clamp jaw mounted on said lug portions and cooperating with said inner section for holding said socket section in position on a strip of cloth, and means adjustably mounted on the lug portions of said socket section and bearing against said inner layer to shorten the length of the free end portion thereof so as to increase its stiffness.

CHRISTIAN J. SCHUHMANN.